United States Patent
Park

(10) Patent No.: US 8,514,274 B2
(45) Date of Patent: Aug. 20, 2013

(54) APPARATUS FOR COMPENSATING 3D IMAGE IN PROJECTOR AND METHOD THEREOF

(75) Inventor: Seong Hong Park, Seoul (KR)

(73) Assignee: LG Electronics Inc., Seoul (KR)

( * ) Notice: Subject to any disclaimer, the term of this patent is extended or adjusted under 35 U.S.C. 154(b) by 386 days.

(21) Appl. No.: 12/846,255

(22) Filed: Jul. 29, 2010

(65) Prior Publication Data

US 2011/0187835 A1 Aug. 4, 2011

(30) Foreign Application Priority Data

Feb. 2, 2010 (KR) .................. 10-2010-0009480

(51) Int. Cl.
*H04N 13/00* (2006.01)
(52) U.S. Cl.
USPC ............................................. 348/51
(58) Field of Classification Search
USPC .................. 347/42–60; 348/42–60
See application file for complete search history.

(56) References Cited

U.S. PATENT DOCUMENTS

| | | | | |
|---|---|---|---|---|
| 5,347,310 A * | 9/1994 | Yamada et al. | ........... | 375/240.03 |
| 7,495,679 B2 * | 2/2009 | Chou | ........................... | 345/690 |
| 7,538,876 B2 * | 5/2009 | Hewitt et al. | ................ | 356/364 |
| 2006/0038880 A1 * | 2/2006 | Starkweather et al. | ......... | 348/51 |
| 2007/0188602 A1 * | 8/2007 | Cowan et al. | ................... | 348/53 |

* cited by examiner

*Primary Examiner* — David Czekaj
*Assistant Examiner* — Md Haque
(74) *Attorney, Agent, or Firm* — Birch, Stewart, Kolasch & Birch, LLP

(57) ABSTRACT

An apparatus for compensating a 3D image in a projector and method thereof are disclosed, by which an image quality of a 3D image can be compensated. The present invention includes a test pattern generating unit generating at least one of a left eye image test pattern and a right eye image test pattern, a display unit displaying the generated test pattern, a sensing unit sensing the displayed test pattern, an analyzing unit extracting an information value of the test pattern by analyzing the sensed test pattern, and an image compensating unit compensating an information value of the left eye image test pattern and an information value of the right eye image test pattern to correspond to the extracted information value, the image compensating unit controlling the display unit to display the 3D image according to the compensated information values.

20 Claims, 6 Drawing Sheets ically pointed out in the written claims hereof as well as the appended drawings.

APPARATUS FOR COMPENSATING 3D IMAGE IN PROJECTOR AND METHOD THEREOF

This application claims the benefit of the Korean Patent Application No. 10-2010-0009480, filed on Feb. 2, 2010, which is hereby incorporated by reference as if fully set forth herein.

BACKGROUND OF THE INVENTION

1. Field of the Invention

The present invention relates to a 3D (3-dimensional) image display device, and more particularly, to an apparatus for compensating a 3D image in a projector and method thereof. Although the present invention is suitable for a wide scope of applications, it is particularly suitable for compensating an image quality of a 3D image.

2. Discussion of the Related Art

Generally, a 3D image displaying device means a video system enabling an observer to experience 3-dimensional lifelikeness and reality using depth information added a 2D (2-dimensional) image by applying stereoscopic technology.

The 3D image displaying device uses the principle of generating a binocular disparity in a manner of providing 2D images for left and right eyes to left and right eyes of an observer, respectively.

The observer is able to view the 3D image in a manner of recognizing the 2D images for the left and right eyes, which are provided by the 3D image displaying device, via retinas of both eyes, respectively.

Specifically, such a 3D image can be implemented to be simultaneously viewed by a plurality of users in a movie theater or the like. And, various technologies have been developed.

For example of one of the developed technologies, there is a 3D image system enabling an observer to view a 3D image. In particular, according to the 3D image system, an image for a left eye and an image for a right eye are separately projected on a screen using a pair of projectors and the observer is able to view a 3D image using polarized 3D glasses.

However, a pair of the projectors should be synchronized with each other and both of the images should be aligned on the screen to be properly located. Thus, the 3D image system should perform a complicated process.

Therefore, the demand for developing new technologies to implement a 3D image by a simple process is rising.

SUMMARY OF THE INVENTION

Accordingly, the present invention is directed to an apparatus for compensating a 3D image in a projector and method thereof that substantially obviate one or more problems due to limitations and disadvantages of the related art.

An object of the present invention is to provide an apparatus for compensating a 3D image in a projector and method thereof, by which an optimal 3D image can be provided in a manner of compensating an image quality difference by comparing and analyzing images for left and right eyes.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for compensating a 3D image in a projector according to the present invention includes a test pattern generating unit generating at least one of a left eye image test pattern and a right eye image test pattern, a display unit displaying the generated test pattern, a sensing unit sensing the displayed test pattern, an analyzing unit extracting an information value of the test pattern by analyzing the sensed test pattern, and an image compensating unit compensating an information value of the left eye image test pattern and an information value of the right eye image test pattern to correspond to the extracted information value, the image compensating unit controlling the display unit to display the 3D image according to the compensated information values.

Preferably, the test pattern generating unit includes a first test pattern generating unit generating the left eye image test pattern, a second test pattern generating unit generating the right eye image test pattern, and a control unit controlling either the first test pattern generating unit or the second test pattern generating unit according to a preset order.

More preferably, the control unit includes a first test pattern generation order determining unit determining a generation order of the left and right eye image test patterns, a video level selecting unit selecting at least one of video levels of the determined test pattern, a second test pattern generation order determining unit, if a plurality of the video levels are selected, the second test pattern generation order determining unit determining a generation order of the corresponding test pattern, and a test pattern control unit controlling the first and second test patterns according to the orders determined by the first and second test pattern generation order determining units.

In this case, the orders determined by the first and second test pattern generation order determining units and the video level selection of the video level selecting unit are set to default values in advance or are set by a user in direct.

Preferably, the test pattern generating unit generates either the left eye image test pattern of a prescribed video level or a right eye image test pattern of a prescribed video level, the test pattern generating unit generates both of the left eye image test pattern of the prescribed video level and the right eye image test pattern of a video level 0 for black, or the test pattern generating unit generates both of the left eye image test pattern of the video level 0 for the black and the right eye image test pattern of the prescribed video level.

Preferably, the analyzing unit includes a first storing unit storing the sensed test pattern, an information extracting unit extracting a luminance and color information value of the stored test pattern by analyzing the stored test pattern, a second storing unit storing the extracted luminance and color information value, and a computing unit computing a difference value between the stored luminance and color information value of the left eye image test pattern and the stored luminance and color information value of the right eye image test pattern by comparing the stored luminance and color information values to each other.

Preferably, the image compensating unit includes a luminance compensating unit compensating luminance values of the left and right eye image test patterns into the same to correspond to the extracted information value, the luminance compensating unit compensating the 3D image according to the compensated luminance value, a color compensating unit compensating color values of the left and right eye image test patterns into the same to correspond to the extracted information value, the color compensating unit compensating the 3D image according to the compensated color value, a switching unit cutting off an externally applied video signal according to the received 3D image compensation request signal, the switching unit releasing the cut off of the external video signal if the left and right eye image test patterns are completely compensated, and a compensation control unit controlling the luminance compensating unit, the color compensating unit and the switching unit.

In another aspect of the present invention, a method of compensating a 3D image in a projector includes the steps of generating at least one of a left eye image test pattern and a right eye image test pattern, displaying the generated test pattern, sensing the displayed test pattern, extracting an information value of the test pattern by analyzing the sensed test pattern, compensating an information value of the left eye image test pattern and an information value of the right eye image test pattern to correspond to the extracted information value, and displaying the 3D image according to the compensated information values.

Preferably, the method further includes the step of receiving a 3D image compensation request signal. And, an image test pattern for compensation is generated according to the received 3D image compensation request signal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

An image quality of a 3D image has not been clearly defined yet. In order to provider a viewer with a most optimal 3D image quality, a 3D image is manually tested in the course of manufacturing a product to reduce crosstalk, eye fatigue and the like as small as possible.

Meanwhile, while a user is using a product, an image quality of a displayed 3D image may be degraded according to an internal or external environment factor generate from the 3D image display device.

In this case, the internal or external environment factor includes a change due to the aging or replacement of a projector light source and the like.

Thus, the demand for an apparatus for compensating an image quality off a 3D image is rising to automatically compensate the degradation of the image quality in the course of using the corresponding product.

Accordingly, the present invention automatically compensates an image quality difference, which may be generated between images for left and right eyes, thereby considerably reducing the disadvantages of the 3D image such as crosstalk, eye fatigue and the like.

Figure 1:
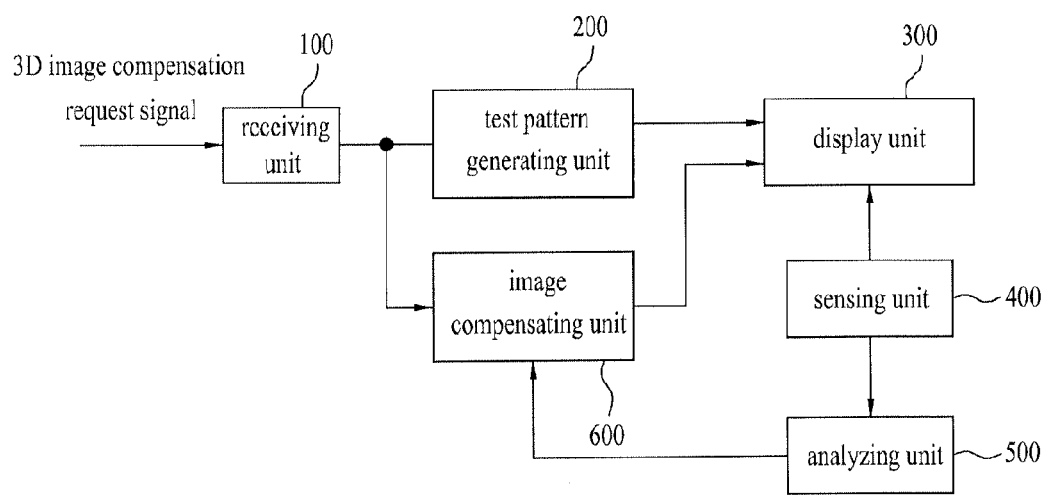
FIG. 1 is a block diagram of a 3D image compensating apparatus according to the present invention.

FIG. 1 is a block diagram of a 3D image compensating apparatus according to the present invention.

Referring to FIG. 1, a 3D image compensating apparatus according to the present invention mainly includes a receiving unit 100, a test pattern generating unit 200, a display unit 300, a sensing unit 400, an analyzing unit 500, and an image compensating unit 600.

The receiving unit plays a role in receiving a 3D image compensation request signal from a user.

And, the test pattern generating unit 200 is able to play a role in generating at least one of a left eye image test pattern and a right eye image test pattern for compensation according to the received 3D image compensation request signal.

Figure 2:
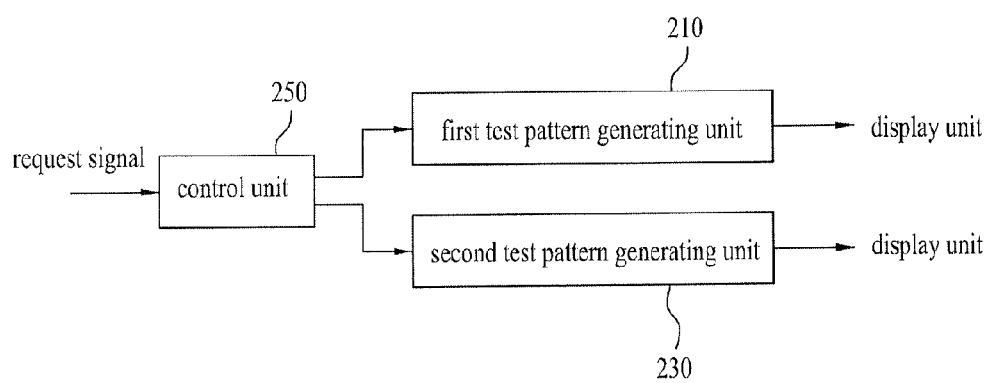
FIG. 2 is a detailed block diagram of a test pattern generating unit shown in FIG. 1.

FIG. 2 is a detailed block diagram of a test pattern generating unit shown in FIG. 1.

Referring to FIG. 2, the test pattern generating unit 200 includes a first test pattern generating unit 210, a second test pattern generating unit 230 and a control unit 250.

In this case, the first test pattern generating unit 210 generates a left eye image test pattern and then transfers the generated pattern to the display unit 300 according to control signal of the control unit 250. And, the second test pattern generating unit 230 generates a right eye image test pattern and then transfers the generated pattern to the display unit 300 according to control signal of the control unit 250.

And, the control unit 250 is able to play a role in controlling one of the first and second test pattern generating units 210 and 230 according to a preset order.

In this case, the control unit 250 can include a first test pattern generation order determining unit 252, a video level selecting unit 254, a second test pattern generation order determining unit 256 and a test pattern control unit 258.

Figure 3:
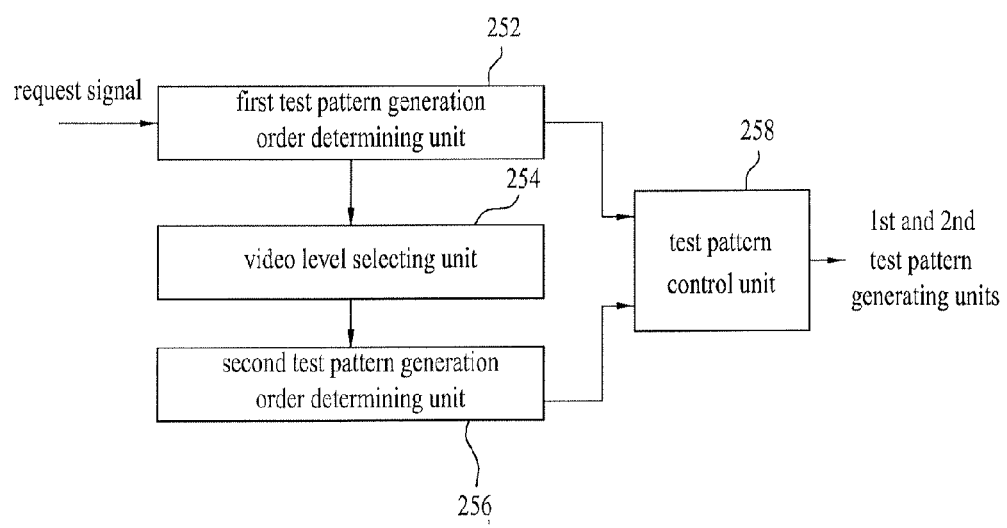
FIG. 3 is a detailed block diagram of a control unit shown in FIG. 2.

FIG. 3 is a detailed block diagram of a control unit shown in FIG. 2.

Referring to FIG. 3, the first test pattern generation order determining unit 252 of the control unit 250 determines a generation order of the left and right eye image test patterns and is then able to transfer the determined generation order to the test pattern control unit 258.

In this case, the generation order determined by the first test pattern generation order determining unit 252 is set to a default value in advance or can be directly determined by a user according to necessity in the course off using a corresponding product.

If a 3D image compensation request signal is applied, the first test pattern generation order determining unit 252 informs the test pattern control unit 258 of a previously stored order or is able to ask a user a setting order via an alarm message or an alarm window.

In this case, an alarm message or window providing unit (not shown in the drawing) generates a necessary alarm message or window according to a control signal of the first test pattern generation order determining unit 252 and is then able to transfer the generated message or window to the display unit.

Subsequently, the video level selecting unit 254 selects at least one video level of the selected left or right image test pattern according to the generation order determined by the first test pattern generation order determining unit 252.

For instance, if the left eye image test pattern is determined to be most preferential generated, video levels to test are selected from the left eye image test pattern.

Preferably, video levels corresponding to red, green and white are selected and a generation order can be determined among the video levels of them. Occasionally, more video levels are selected to generate test patterns.

Yet, in case that test patterns are generated in a manner that the number of the generated test patterns is greater than that of the test patterns of the video levels corresponding to red, green, blue and white, it becomes disadvantageous in that a time taken to compensate the test patterns is elongated. In case that test patterns are generated in a manner that the number of the generated test patterns is smaller than that of the test patterns of the video levels corresponding to the red, green, blue and white, an image quality enhanced effect of the 3D image may be reduced.

Of course, the generation order can be previously set to a default value in the video level selecting unit 254. Alternatively, the generation order can be set by a user in direct if necessary.

If the generation order of the test patterns is determined as a first order by the first test pattern generation order determining unit 252, the video level selecting unit 254 informs the second test pattern generation order determining unit 256 of the previously stored order or can ask a user the setting order via the alarm message or the alarm window.

In this case, an alarm message or window providing unit (not shown in the drawing) generates a necessary alarm message or window according to a control signal of the video level selecting unit 254 and is then able to transfer the generated message or window to the display unit.

Subsequently, in case that if a plurality off video levels are selected, the second test pattern generation order determining unit 256 determines a generation order of test patterns corresponding to a plurality of the selected video levels and then transfers the determined generation order to the test pattern control unit 258.

In this case, the generation order determined by the second test pattern generation order determining unit 256 can be previously set to a default value. Alternatively, the generation order can be set by a user in direct if necessary.

Accordingly, if a video level is selected by the video level selecting unit 254, the second test pattern generation order determining unit 256 informs the test pattern control unit 258 of a previously stored order or is able to ask a user a setting order via an alarm message or an alarm window.

In this case, an alarm message or window providing unit (not shown in the drawing) generates a necessary alarm message or window according to a control signal of the second test pattern generation order determining unit 256 and is then able to transfer the generated message or window to the display unit.

The test pattern control unit 258 is able to control the first test pattern generating unit 210 and the second test pattern generating unit 230 according to the determined orders of the first and second test pattern generation order determining units 252 and 256.

Meanwhile, the above-configured test pattern generating unit 200 generates a prescribed one of a left eye image test pattern of a prescribed video level and a right eye image test pattern of a prescribed video level. Alternatively, the above-configured test pattern generating unit 200 generates both a left eye image test pattern of a prescribed video level and a right eye image test pattern of a video level 0 for black. Alternatively, the above-configured test pattern generating unit 200 generates both a left eye image test pattern of a video level 0 for black and a right eye image test pattern of a prescribed video level.

In particular, the test pattern generating unit 200 is able to diversely generate test patterns according to a structural design of the display unit 300.

For instance, if the display unit 300 includes a 3D image projector system having a dual engine. A pair of engines and one projection lens are provided within one projector. One of a pair of the engines generates a left eye image, while the other generates a right eye image.

In this case, in case of generating a left eye image test pattern of a prescribed video level, the test pattern generating unit 200 also generates a right eye image test pattern of a video level 0 for black to enable the display unit 300 to display the left eye image test pattern on a screen with high luminance and clear colors.

On the contrary, in case of generating a right eye image test pattern of a prescribed video level, the test pattern generating unit 200 also generates a left eye image test pattern of a video level 0 for black to enable the display unit 300 to display the right eye image test pattern on a screen with high luminance and clear colors.

For another instance, in case that the display unit 300 includes a 3D image projector system having a single engine, the test pattern generating unit 200 is able to generate either a left eye image test pattern of a prescribe video level or a right eye image test pattern of a prescribe video level.

In particular, the test pattern generating unit 200 generates a left eye image test pattern of a prescribe video level according to a priority and the display unit 300 displays the left eye image test pattern on a screen only. If an information value of the displayed test pattern is completely analyzed, the test pattern generating unit 200 generates a right eye image test pattern of a prescribe video level according to a next priority and the display unit 300 is able to display the right eye image test pattern on the screen only.

As mentioned in the above description, the test pattern generating unit 200 can have a test pattern generating method differing according to a structural design of the display unit 300.

Meanwhile, the display unit 300 plays a role in projecting the generated test pattern on the screen. For example, the display unit 300 can include a 3D image projector system having a dual engine or a single engine.

The sensing unit 400 plays a role in sensing the test pattern displayed on the screen.

In this case, the sensing unit 400 can include any type of camera capable of photographing the displayed pattern. Preferably, the sensing unit 400 includes a camera having a function of tracking a shifted location of the displayed test pattern.

In particular, a camera is provided within or outside a projector by being fixed thereto. According to a displacement of a projection lens of the projector, an image appearing on a screen can be displayed in a manner of being shifted from a previous location.

In case that the camera is fixed externally, it is connected to the projector via a signal cable. And, an image captured by the camera can be transferred to the projector via the signal cable.

In this case, the received image from the camera is inputted to the analyzing unit 500.

Therefore, the camera is able to automatically recognize the shifted test image via the device for tracking the shifted location of the test pattern.

For instance, in case that the fixed camera is unable to photograph a test image on a prescribed region of a screen due to a shift of a text image on the screen, the shifted test image can be tracked and photographed through a zoom function.

The analyzing unit 500 is able to extract an information value of the test pattern by analyzing the test pattern sensed by the sensing unit 400.

Figure 4:
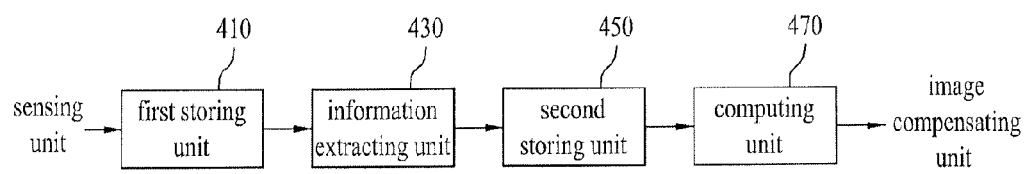
FIG. 4 is a detailed block diagram of an analyzing unit shown in FIG. 1.

FIG. 4 is a detailed block diagram of an analyzing unit shown in FIG. 1.

Referring to FIG. 4, the analyzing unit shown in FIG. 1 can include a first storing unit 410, an information extracting unit 430, a second storing unit 450 and a computing unit 470.

In this case, the first storing unit 410 stores a sensed test pattern. The information extracting unit 430 analyzes the test pattern stored in the first storing unit 410 and then extracts luminance and color information value of the analyzed test pattern.

The second storing unit 450 stores the extracted luminance and color information value. The computing unit 470 computes a difference value in a manner of comparing a luminance and color value of a left eye image test pattern stored in the second storing unit 450 to a luminance and color value of a right eye image test pattern stored in the second storing unit 450.

In particular, the analyzing unit 500 extracts and stores the luminance and color value of the test pattern sensed by the sensing unit 400. The analyzing unit 500 compares the luminance and color values of the left and right eye image test patterns having the same video level to each other among the stored luminance and color values and then finds a corresponding difference in-between.

In this case, the extracted luminance and color value of the test pattern can include overall luminance and color value of an image implemented on one screen or luminance and color value of each pixel for an image implemented on one screen.

Therefore, the computing unit 470 of the analyzing unit 500 is able to find a difference value by comparing overall luminance and color values of left and right eye image test patterns having the same video level to each other. Alternatively, the computing unit 470 of the analyzing unit 500 can find a difference value by comparing a luminance and color value of each pixel for a left eye image test pattern to a luminance and color value of each pixel for a right eye image test pattern. In this case, a video level of the left eye image test pattern is equal to that of the right eye image test pattern.

Subsequently, the image compensating unit 600 compensates the information values of the left and right eye image test patterns in a manner that the information values are equal to each other to correspond to the computed difference value. The image compensating unit 600 is able to control the display unit to display a 3D image according to the compensated information value.

Figure 5:
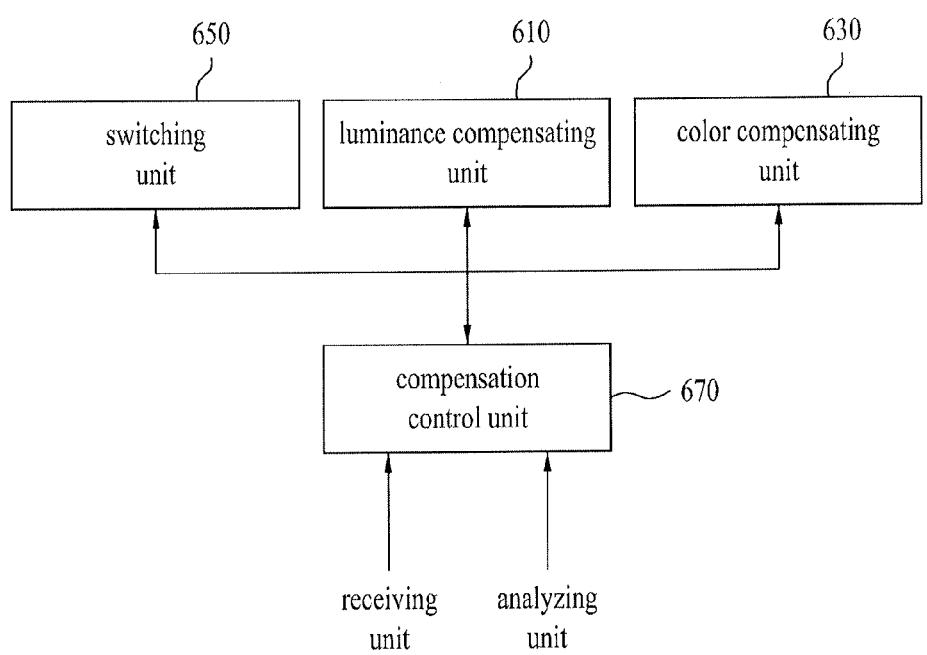
FIG. 5 is a detailed block diagram of an image compensating unit shown in FIG. 1.

FIG. 5 is a detailed block diagram of an image compensating unit shown in FIG. 1.

Referring to FIG. 5, the image compensating unit can include a luminance compensating unit 610, a color compensating unit 630, a switching unit 650 and a compensation control unit 670.

The luminance compensating unit 610 compensates the luminance values of the left and right image test patterns into the same according to the difference value computed by the computing unit 470 and is then able to compensate a 3D image according to the compensated luminance value.

In this case, in case of compensating the luminance values of the left and right image test patterns into the same according to the difference value computed by the computing unit 470, the luminance compensating unit 610 compensates the luminance values of the left and right eye image test patterns into the same in a following manner. First of all, if one of the left eye image test pattern and the right eye image test pattern has a luminance value greater than that of the other, the computed difference value is subtracted from the luminance value of the test pattern having a higher luminance value. Hence, the luminance value of the corresponding test pattern is lowered to enable the left and right eye image test patterns to have the same luminance value.

Alternatively, in case of compensating the luminance values of the left and right image test patterns into the same according to the difference value computed by the computing unit 470, the luminance compensating unit 610 compensates the luminance values of the left and right eye image test patterns into the same in a following manner. First of all, if one of the left eye image test pattern and the right eye image test pattern has a luminance value smaller than that of the other, the computed difference value is added to the luminance value of the test pattern having a lower luminance value. Hence, the luminance value of the corresponding test pattern is raised to enable the left and right eye image test patterns to have the same luminance value.

Alternatively, in case of compensating the luminance values of the left and right image test patterns into the same according to the difference value computed by the computing unit 470, the luminance compensating unit 610 compensates the luminance values of the left and right eye image test patterns into the same in a following manner. First of all, if one of the left eye image test pattern and the right eye image test pattern has a luminance value greater than that of the other, a half of the computed difference value is subtracted from the luminance value of the test pattern having a higher luminance value and a half of the computed difference value is added to the luminance value of the test pattern having a lower luminance value. Hence, the corresponding test patterns are compensated to have the same luminance value.

The color compensating unit 630 compensates the color values of the left and right eye image test patterns into the same according to the difference value computed by the computing unit 470 and enables a 3D image to be compensated according to the compensated color value.

In this case, in case of compensating the color values of the left and right image test patterns into the same according to the difference value computed by the computing unit 470, the color compensating unit 630 compensates the color values of the left and right eye image test patterns into the same in a following manner. First of all, if one of the left eye image test pattern and the right eye image test pattern has a color value greater than that of the other, the computed difference value is subtracted from the color value of the test pattern having a higher color value. Hence, the color value of the corresponding test pattern is lowered to enable the left and right eye image test patterns to have the same color value.

Alternatively, in case of compensating the color values of the left and right image test patterns into the same according to the difference value computed by the computing unit 470, the color compensating unit 630 compensates the color values of the left and right eye image test patterns into the same in a following manner. First of all, if one of the left eye image test pattern and the right eye image test pattern has a color value smaller than that of the other, the computed difference value is added to the color value of the test pattern having a lower color value. Hence, the color value of the corresponding test pattern is raised to enable the left and right eye image test patterns to have the same color value.

Occasionally, in case of compensating the color values of the left and right image test patterns into the same according to the difference value computed by the computing unit 470, the color compensating unit 630 compensates the color values of the left and right eye image test patterns into the same in a following manner. First of all, if one of the left eye image test pattern and the right eye image test pattern has a color value greater than that of the other, a half of the computed difference value is subtracted from the color value of the test pattern having a higher color value and a half of the computed difference value is added to the color value of the test pattern having a lower color value. Hence, the corresponding test patterns are compensated to have the same color value.

Subsequently, the switching unit 650 cuts off a video signal inputted externally according to a received 3D image compensation request signal. If the compensation of the left and right eye image test patterns is completed, the switching unit 650 releases the cutoff of the external video signal.

The compensation control unit 670 controls the luminance compensating unit 610, the color compensating unit 630 and the switching unit 650.

A compensating method of the above-configured 3D image compensating apparatus according to the present invention is explained as follows.

Figure 6:
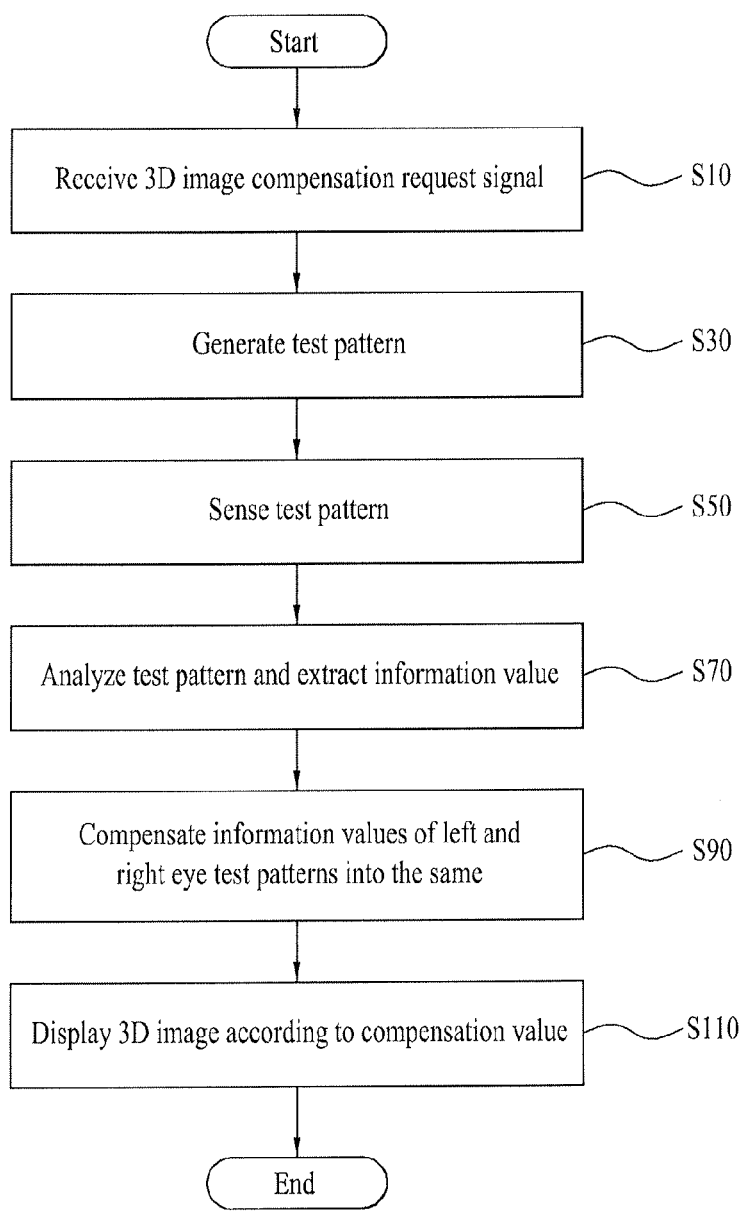
FIG. 6 is a flowchart for a method of compensating a 3D image according to the present invention.

FIG. 6 is a flowchart for a method of compensating a 3D image according to the present invention.

Referring to FIG. 6, if the receiving unit 100 of the 3D image compensating apparatus receives a 3D image compensation request signal from a user [S10], the test pattern generating unit 200 generates at least one of a left eye image test pattern and a right eye image test pattern for compensation according to the received 3D image compensation request signal [S30].

Figure 7:
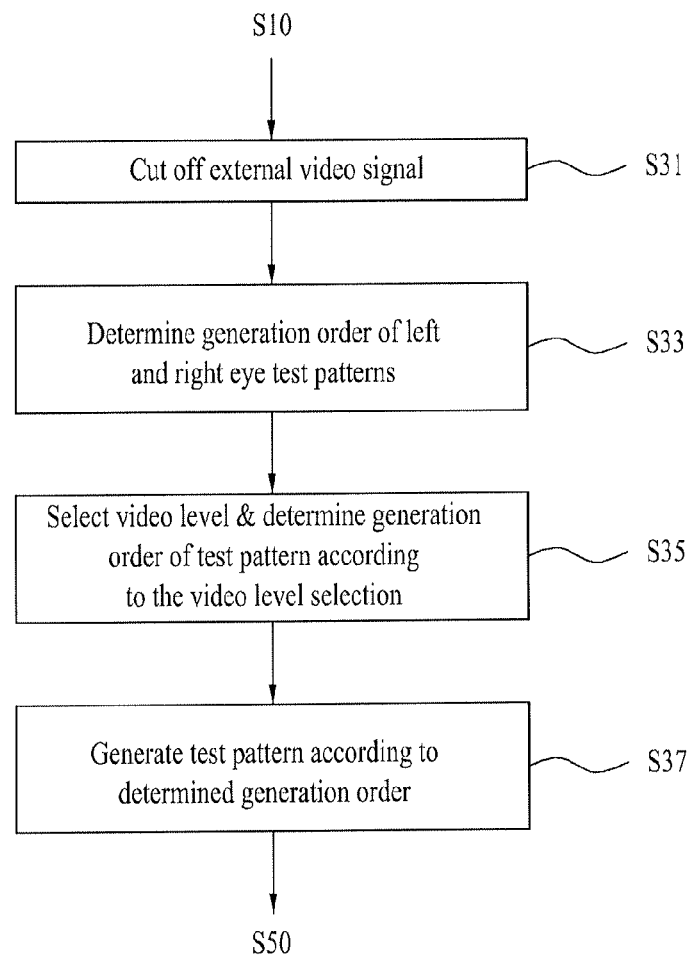
FIG. 7 is a detailed flowchart of a test pattern generating step shown in FIG. 6.

FIG. 7 is a detailed flowchart of a test pattern generating step shown in FIG. 6.

Referring to FIG. 7, the switching unit 650 of the image compensating unit 600 cuts of an external video signal according to the received 3D image compensation request signal [S31].

Subsequently, the first test pattern generation order determining unit 252 of the test pattern generating unit 200 determines a generation order of the left and right eye image test patterns [S33].

The video level selecting unit 254 of the control unit 250 selects a video level of the generation order determined test pattern. The second test pattern generation order determining unit 256 of the test pattern generating unit 200 then determines a generation order of the test pattern corresponding to the selected video level [S35].

Subsequently, the test pattern control unit 258 of the control unit 250 generates at least one of the left eye image test pattern and the right eye image test pattern according to the determined generation order by controlling the first test pattern generating unit 210 and the second test pattern generating unit 230 [S37].

After completion of the above steps, the display unit 300 displays the generated test pattern and the sensing unit 400 then senses the displayed test pattern [S50].

Subsequently, the analyzing unit 500 extracts an information value of the test pattern by analyzing the sensed test pattern [S70].

Figure 8:
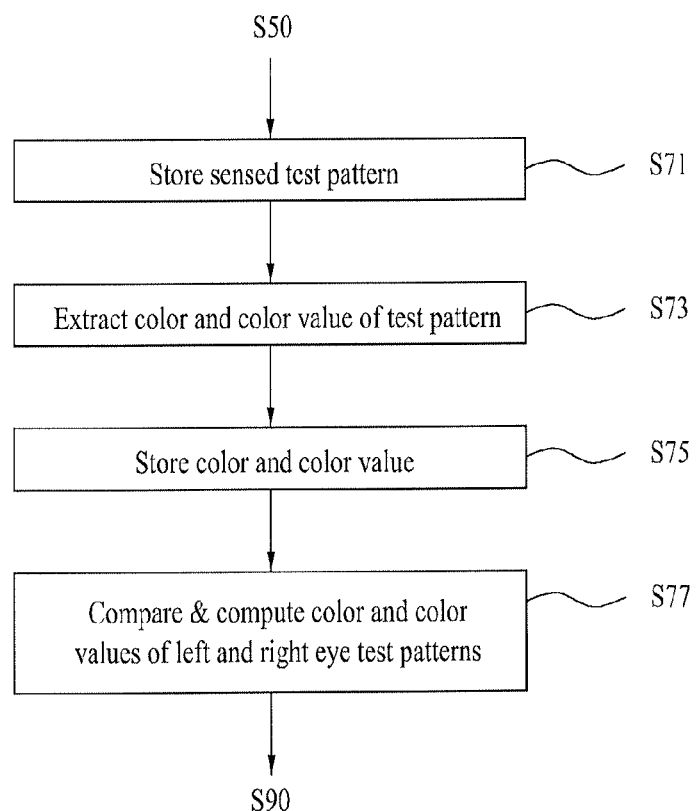
FIG. 8 is a detailed flowchart of the step of extracting an information value of a test pattern in FIG. 6.

FIG. 8 is a detailed flowchart of the step of extracting the information value of the test pattern in FIG. 6.

Referring to FIG. 8, the first storing unit 410 of the analyzing unit 500 stores the sensed test pattern [S71].

The information extracting unit 430 of the analyzing unit 500 analyzes the stored test pattern and then extracts a luminance and color information value of the analyzed test pattern [s73].

In this case, the extracted luminance and color value of the test pattern can include overall luminance and color value of an image implemented on one screen or luminance and color value of each pixel for an image implemented on one screen.

Subsequently, the second storing unit 450 of the analyzing unit 500 stores the extracted luminance and color information value [S75] and the computing unit 470 of the analyzing unit 500 then computes a difference value by comparing the stored luminance and color value of the left eye image test pattern and the stored luminance and color value of the right eye image test pattern to each other [S77].

The image compensating unit 600 compensates the information values of the left and right image test patterns into the same according to the computed difference value [S90]. The display unit 300 then displays a 3D image according to the compensated information value [S110].

In particular, the luminance compensating unit 610 and the color compensating unit 630 of the image compensating unit 600 compensates the luminance and color value of the left eye image test pattern and the luminance and color value of the right eye image test pattern into the same to correspond to the computed difference value.

In this case, in case of compensating the luminance and color values of the left and right image test patterns into the same according to the difference value computed by the computing unit 470, the luminance and color compensating units 610 and 630 compensate the luminance and color values of the left and right eye image test patterns into the same in a following manner. First of all, if one of the left eye image test pattern and the right eye image test pattern has a luminance and color value greater than that of the other, the computed difference value is subtracted from the luminance and color value of the test pattern having a higher luminance and color value. Hence, the luminance and color value of the corresponding test pattern is lowered to enable the left and right eye image test patterns to have the same luminance and color value.

Alternatively, in case of compensating the luminance and color values of the left and right image test patterns into the same according to the difference value computed by the computing unit 470, the luminance and color compensating units 610 and 630 compensate the luminance and color values of the left and right eye image test patterns into the same in a following manner. First of all, if one of the left eye image test pattern and the right eye image test pattern has a luminance and color value smaller than that of the other, the computed difference value is added to the luminance and color value of the test pattern having a lower color value. Hence, the luminance and color value of the corresponding test pattern is raised to enable the left and right eye image test patterns to have the same luminance and color value.

Occasionally, in case of compensating the color values of the left and right image test patterns into the same according to the difference value computed by the computing unit 470, the luminance and color compensating units 610 and 630 compensate the luminance and color values of the left and right eye image test patterns into the same in a following manner. First of all, if one of the left eye image test pattern and the right eye image test pattern has a luminance and color value greater than that of the other, a half of the computed difference value is subtracted from the luminance and color value of the test pattern having a higher color value and a half of the computed difference value is added to the luminance and color value of the test pattern having a lower color value. Hence, the corresponding test patterns are compensated to have the same luminance and color value.

Subsequently, if the compensation of the left and right eye image test patterns is completed, the compensation control unit 670 of the image compensating unit 600 controls the switching unit 650 to release the cutoff of the external video signal.

Afterwards, the display unit 300 displays a 3D image according to the compensated luminance and color value.

Accordingly, the present invention compares and analyzes a left eye image and a right eye image and then compensates the left and right eye images to have the same image quality using a difference in-between, whereby the serious disadvantages of a 3D image, i.e., crosstalk and eye fatigue can be considerably reduced.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An apparatus for compensating a 3D image in a projector, comprising:
    a test pattern generating unit configured to generate at least one of a left eye image test pattern and a right eye image test pattern;
    a display unit configured to display the generated test pattern;
    a sensing unit configured to sense the displayed test pattern;
    an analyzing unit configured to extract an information value of the test pattern by analyzing the sensed test pattern; and
    an image compensating unit configured to compensate an information value of the left eye image test pattern and an information value of the right eye image test pattern to correspond to the extracted information value, the image compensating unit further configured to control the display unit to display the 3D image according to the compensated information values,
    wherein the test pattern generating unit includes:
        a first test pattern generating unit configured to generate the left eye image test pattern,
        a second test pattern generating unit configured to generate the right eye image test pattern, and
        a control unit configured to control either the first test pattern generating unit or the second test pattern generating unit according to a preset order, and
    wherein the control unit includes:
        a first test pattern generation order determining unit configured to determine a generation order of the left and right eye image test patterns,
        a video level selecting unit configured to select at least one of video levels of the left and right eye image test patterns according to the determined generation order,
        a second test pattern generation order determining unit, if a plurality of the video levels are selected, the second test pattern generation order determining unit configured to determine a generation order of the test patterns corresponding to the at least one of video levels, and
    a test pattern control unit configured to control the left and right eye test patterns according to the generation orders determined by the first and second test pattern generation order determining units.

2. The apparatus of claim 1, wherein the orders determined by the first and second test pattern generation order determining units and the video level selection of the video level selecting unit are set to default values in advance or are set by a user in direct.

3. The apparatus of claim 1, wherein the first or second test pattern generation order determining unit informs the test pattern control unit of the previously stored test pattern generation order or wherein the first or second test pattern generation order determining unit asks a user the test pattern generation order via an alarm message or an alarm window.

4. The apparatus of claim 1, wherein the video level selecting unit informs the test pattern control unit of the previously stored video level selection order or wherein the video level selecting unit asks a user the video level selection order via an alarm message or an alarm window.

5. The apparatus of claim 1, further comprising an alarm message/window providing unit configured to generate an alarm message/window according to a control signal of one of the first test pattern generation order determining unit and the second test pattern generation order determining unit and the video level selecting unit, the alarm message/window providing unit further configured to transfer the generated alarm message/window to the display unit.

6. The apparatus of claim 1, wherein the test pattern generating unit generates either the left eye image test pattern of a prescribed video level or a right eye image test pattern of a prescribed video level, wherein the test pattern generating unit generates both of the left eye image test pattern of the prescribed video level and the right eye image test pattern of a video level 0 for black, or wherein the test pattern generating unit generates both of the left eye image test pattern of the video level 0 for the black and the right eye image test pattern of the prescribed video level.

7. The apparatus of claim 1, wherein the sensing unit includes a camera.

8. The apparatus of claim 7, wherein the camera is configured to track a shifted location of the displayed test pattern.

9. The apparatus of claim 1, wherein the analyzing unit includes:
    a first storing unit configured to store the sensed test pattern,
    an information unit configured to extract a luminance and color information value of the stored test pattern by analyzing the stored test pattern,
    a second storing unit configured to store the extracted luminance and color information value, and
    a computing unit configured to compute a difference value between the stored luminance and color information value of the left eye image test pattern and the stored luminance and color information value of the right eye image test pattern by comparing the stored luminance and color information values to each other.

10. The apparatus of claim 9, wherein the computing unit finds the difference value by comparing whole luminance and color values of the left and right eye image test patterns having the same video level to each other.

11. The apparatus of claim 9, wherein when the left and right eye image test patterns have the same video level, the computing unit finds the difference value by comparing a luminance and color value of each pixel for the left eye image test pattern to a luminance and color value of each pixel for the eight image test pattern.

12. The apparatus of claim 1, wherein the image compensating unit includes:
   a luminance compensating unit configured to compensate luminance values of the left and right eye image test patterns into the same to correspond to the extracted information value, the luminance compensating unit further configured to compensate the 3D image according to the compensated luminance value,
   a color compensating unit configured to compensate color values of the left and right eye image test patterns into the same to correspond to the extracted information value, the color compensating unit further configured to compensate the 3D image according to the compensated color value,
   a switching unit configured to cut off an externally applied video signal according to the received 3D image compensation request signal, the switching unit further configured to release the cut off of the external video signal if the left and right eye image test patterns are completely compensated, and
   a compensation control unit configured to control the luminance compensating unit, the color compensating unit and the switching unit.

13. The apparatus of claim 12, wherein if one of the left and right eye image test patterns has the luminance value higher than that of the other, the luminance compensating unit compensates the luminance value of the test pattern having the higher luminance value into the luminance value of the test pattern having a lower luminance value and wherein if one of the left and right eye image test patterns has the color value higher than that of the other, the color compensating unit compensates the color value of the test pattern having the higher color value into the color value of the test pattern having a lower color value.

14. The apparatus of claim 12, wherein if one of the left and right eye image test patterns has the luminance value lower than that of the other, the luminance compensating unit compensates the luminance value of the test pattern having the lower luminance value into the luminance value of the test pattern having a higher luminance value and wherein if one of the left and right eye image test patterns has the color value lower than that of the other, the color compensating unit compensates the color value of the test pattern having the lower color value into the color value of the test pattern having a higher color value.

15. The apparatus of claim 12, wherein if one of the left and right eye image test patterns has the luminance value higher than that of the other, the luminance compensating unit compensates luminances of the left and right eye image test patterns into the same in a manner of lowering the luminance value of the test pattern having the higher luminance value by a half of a difference between the luminance value of the left eye image test pattern and the luminance value of the right eye image test pattern and raising the luminance value of the test pattern having a lower luminance value by the half of the difference between the luminance value of the left eye image test pattern and the luminance value of the right eye image test pattern and wherein if one of the left and right eye image test patterns has the color value higher than that of the other, the color compensating unit compensates colors of the left and right eye image test patterns into the same in a manner of lowering the color value of the test pattern having the higher color value by a half of a difference between the color value of the left eye image test pattern and the color value of the right eye image test pattern and raising the color value of the test pattern having a lower color value by the half of the difference between the color value of the left eye image test pattern and the color value of the right eye image test pattern.

16. The apparatus of claim 1, further comprising a receiving unit configured to receive a 3D image compensation request signal, wherein the test pattern generating unit generates an image test pattern for compensation.

17. A method of compensating a 3D image in a projector, comprising the steps of:
   generating, respectively by a first test pattern generating unit and a second test pattern generating unit, at least one of a left eye image test pattern and a right eye image test pattern;
   displaying the generated test pattern;
   sensing the displayed test pattern;
   extracting an information value of the test pattern by analyzing the sensed test pattern;
   compensating an information value of the left eye image test pattern and an information value of the right eye image test pattern to correspond to the extracted information value;
   controlling to display the 3D image according to the compensated information Values; and
   controlling either the first test pattern generating unit or the second test pattern generating unit according to a preset order,
   wherein the step of generating the at least one of the left eye image test pattern and the right eye image test pattern includes the steps of:
      determining a generation order of the left and right eye image test patterns,
      selecting at least one of video levels of the left and right eye image test patterns according to the determined generation order,
      if a plurality of the video levels are selected, determining a generation order of the test patterns corresponding to the at least one of video levels, and
      controlling the left and right eye image test patterns according to the determined generation orders.

18. The method of claim 17, wherein the step of extracting the information value of the test pattern by analyzing the sensed test pattern includes the steps of:
   storing the sensed test pattern,
   extracting a luminance and color information value of the stored test pattern by analyzing the stored test pattern,
   storing the extracted luminance and color information value, and
   computing a difference value between the stored luminance and color information value of the left eye image test pattern and the stored luminance and color information value of the right eye image test pattern by comparing the stored luminance and color information values to each other.

19. The method of claim 17, wherein the step of displaying the 3D image according to the compensated information value includes the steps of:
   compensating luminance and color values of the left and right eye image test patterns into the same to correspond to the extracted information value, if the luminance and color values of the left and right eye image test patterns are completely compensated, releasing the external video signal from being cut off, and displaying the 3D image according to the compensated luminance and color values.

20. The method of claim 17, further comprising the step of receiving a 3D image compensation request signal, wherein an image test pattern for compensation is generated according to the received 3D image compensation request signal.

* * * * *